(12) United States Patent
Zatepyakin et al.

(10) Patent No.: US 10,810,779 B2
(45) Date of Patent: Oct. 20, 2020

(54) METHODS AND SYSTEMS FOR IDENTIFYING TARGET IMAGES FOR A MEDIA EFFECT

(71) Applicant: Facebook, Inc., Menlo Park, CA (US)

(72) Inventors: Evgeny Zatepyakin, London (GB); Yauheni Neuhen, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 48 days.

(21) Appl. No.: 15/834,240

(22) Filed: Dec. 7, 2017

(65) Prior Publication Data

US 2019/0180490 A1    Jun. 13, 2019

(51) Int. Cl.
| | |
|---|---|
| *G06T 13/40* | (2011.01) |
| *G06T 7/11* | (2017.01) |
| *G06K 9/00* | (2006.01) |
| *G10H 1/36* | (2006.01) |
| *G06F 16/00* | (2019.01) |
| *G06T 7/00* | (2017.01) |

(52) U.S. Cl.
CPC .............. *G06T 13/40* (2013.01); *G06F 16/00* (2019.01); *G06K 9/00* (2013.01); *G06T 7/0002* (2013.01); *G06T 7/11* (2017.01); *G10H 1/368* (2013.01); *G06T 2207/10016* (2013.01); *G06T 2207/10024* (2013.01); *G06T 2207/20132* (2013.01); *G06T 2207/30168* (2013.01); *G06T 2207/30201* (2013.01); *G10H 2220/011* (2013.01); *G10H 2220/145* (2013.01); *G10H 2220/455* (2013.01)

(58) Field of Classification Search
CPC .................................. G06T 13/40; G06T 7/11
USPC .......................................................... 345/473
See application file for complete search history.

(56) References Cited

U.S. PATENT DOCUMENTS

| | | | |
|---|---|---|---|
| 6,514,083 B1 | 2/2003 | Kumar et al. | |
| 6,692,259 B2 | 2/2004 | Kumar et al. | |
| 7,027,054 B1 * | 4/2006 | Cheiky | ................... G06T 13/40 345/473 |
| 7,053,915 B1 | 5/2006 | Jung et al. | |
| 7,889,886 B2 | 2/2011 | Matsugu et al. | |
| 9,041,784 B2 | 5/2015 | Rivera et al. | |
| 9,064,484 B1 | 6/2015 | Jaaskelainen et al. | |
| 9,256,284 B2 | 2/2016 | Hanaya et al. | |
| 9,324,064 B2 | 4/2016 | Rivera et al. | |
| 9,792,954 B2 | 10/2017 | Hanaya et al. | |
| 9,959,012 B2 | 5/2018 | Rivera et al. | |

(Continued)

*Primary Examiner* — Hai Tao Sun

(57) ABSTRACT

Exemplary embodiments relate to the application of media effects such as facial mask overlays, to visual data (such as a video or photo). Publicly-available images may be found and mapped to a mask. In the mapping process, a user may type in the name of a celebrity or public figure, and a system may perform a public image search. In some embodiments, candidate images may be filtered in order to remove images unsuitable for use in masks. Typically, only a single forward-facing image is required for mapping. However, multiple images may be used to provide different angles and allow the user to turn their head while the mask is applied. Mask generation may involve: extracting facial features from the image; mapping the facial features to the user's video; blending/recoloring of either or both of the image or the person's face; and applying the mask in real-time/on the fly.

17 Claims, 15 Drawing Sheets

(56) References Cited

U.S. PATENT DOCUMENTS

| | | |
|---|---|---|
| 9,990,615 B2 | 6/2018 | Rivera et al. |
| 2003/0124499 A1 | 7/2003 | Kumar et al. |
| 2007/0258656 A1 | 11/2007 | Aarabi |
| 2008/0267443 A1 | 10/2008 | Aarabi |
| 2010/0141679 A1 | 6/2010 | Lee |
| 2010/0209069 A1 | 8/2010 | Fountaine |
| 2010/0209073 A1 | 8/2010 | Fountaine |
| 2010/0254594 A1* | 10/2010 | Wang ................ G06T 11/00 382/155 |
| 2010/0278426 A1* | 11/2010 | Piramuthu ........ G06K 9/00234 382/173 |
| 2012/0299945 A1 | 11/2012 | Aarabi |
| 2013/0070093 A1 | 3/2013 | Rivera et al. |
| 2014/0053217 A1 | 2/2014 | Rivera et al. |
| 2014/0081797 A1 | 3/2014 | Rivera et al. |
| 2014/0186002 A1 | 7/2014 | Hanaya et al. |
| 2015/0037777 A1 | 2/2015 | Kushner |
| 2015/0189397 A1 | 7/2015 | Rivera et al. |
| 2015/0227905 A1 | 8/2015 | Rivera et al. |
| 2015/0302239 A1* | 10/2015 | Ohba ................ G06K 9/00261 382/154 |
| 2016/0155474 A1 | 6/2016 | Hanaya et al. |
| 2017/0193280 A1* | 7/2017 | Huang ............... G06K 9/00234 |
| 2018/0075317 A1* | 3/2018 | Gomez Suarez .... G06K 9/4671 |

\* cited by examiner

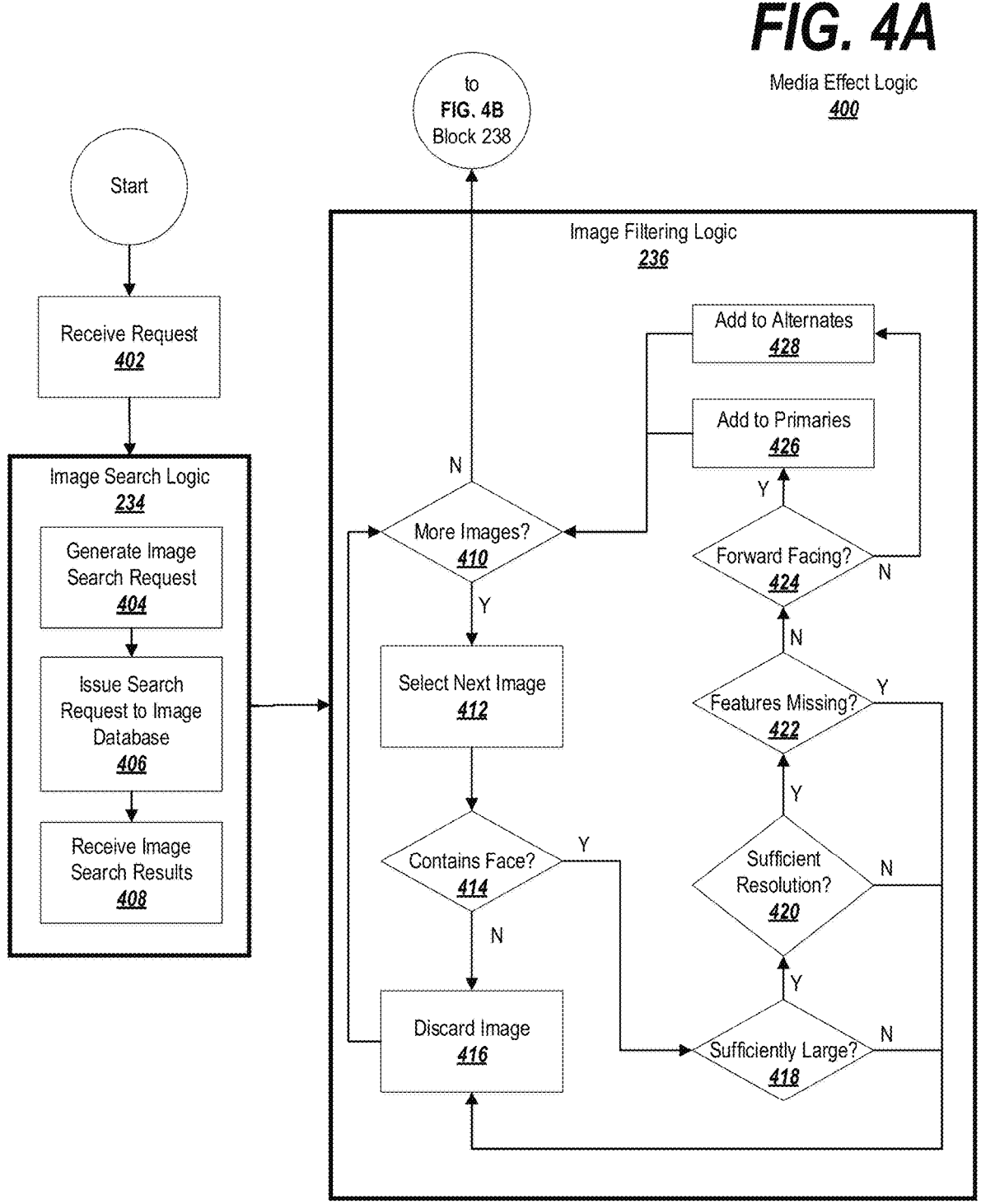

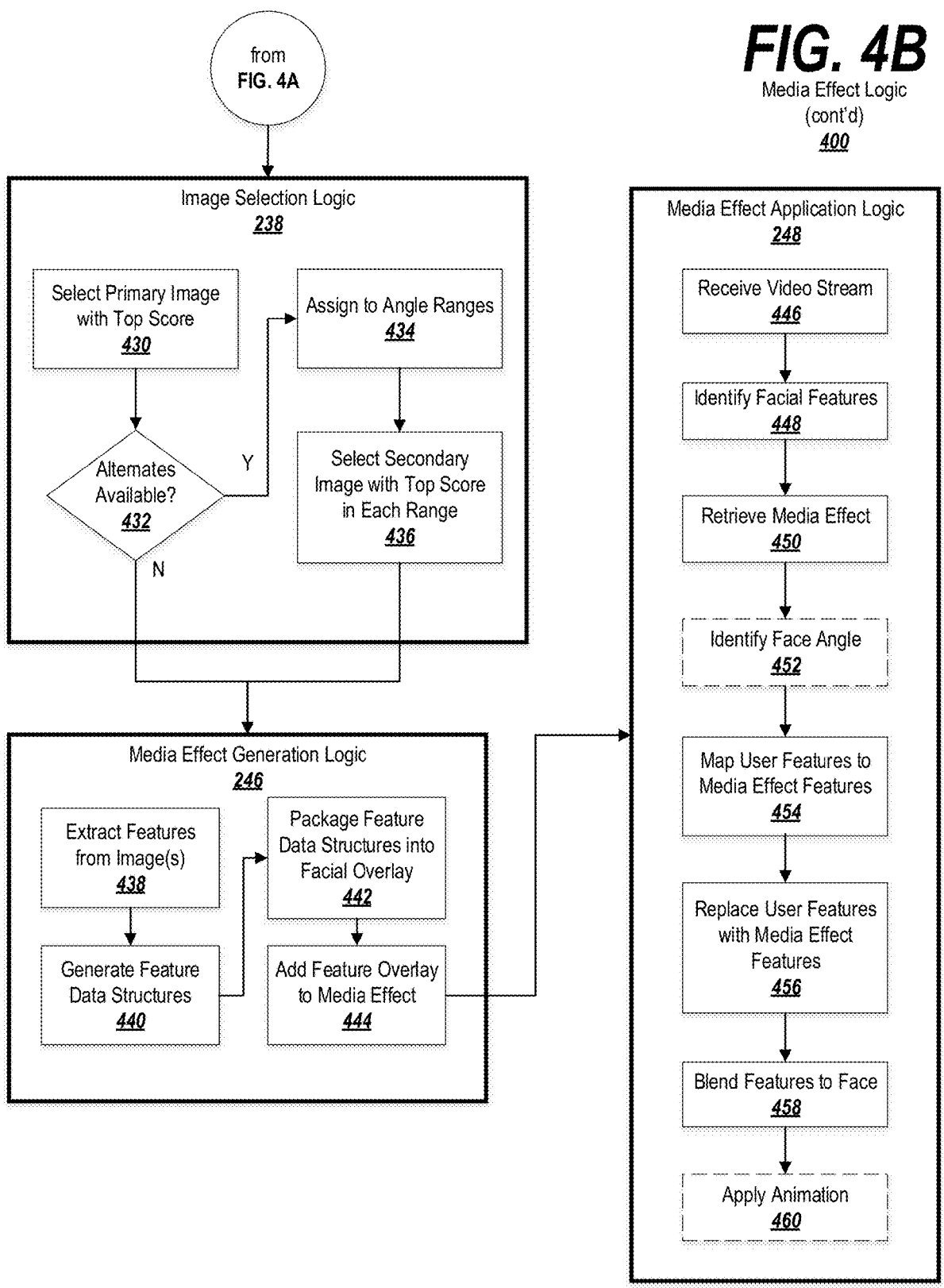

Distributed Communication System
550

US 10,810,779 B2

METHODS AND SYSTEMS FOR IDENTIFYING TARGET IMAGES FOR A MEDIA EFFECT

BACKGROUND

Facial detection technology allows for the detection of a face in a photo or video, and in some cases allows for individuals to be identified based on their facial characteristics. Recently, facial detection techniques have been used to apply overlays on faces, such as by adding a graphical mask over a face in a video.

BRIEF DESCRIPTION OF THE DRAWINGS

FIGS. 4A-4B depict a flowchart showing an exemplary method for generating and applying a media effect based on an image search;

DETAILED DESCRIPTION

Figure 1A:
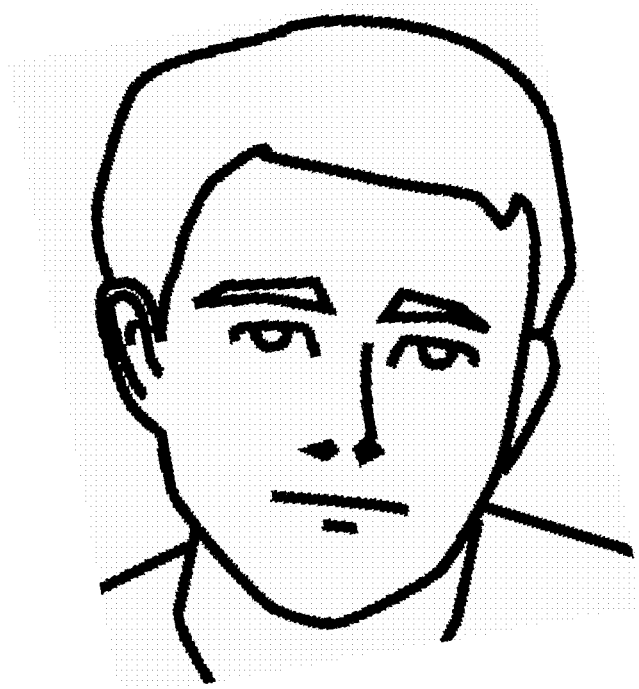
FIG. 1A depicts an exemplary facial overlay to be applied to a face of a user.

Exemplary embodiments relate to the application of media effects, such as facial mask overlays, to visual data (e.g., a video or photo). Publicly-available images may be found and mapped to a mask. In the mapping process, a user may type in the name of a celebrity or public figure, and a system may perform a public image search.

In some embodiments, candidate images may be filtered in order to remove images unsuitable for use in masks, or to preferentially select target images that better lend themselves to mask application. Filtering may involve applying an initial filter that determines whether the image contains a face. If so, further filters may be applied. The further filters may determine, for example, if the face is large enough or high enough resolution, if the face is too large (e.g., whether some necessary facial features are cut off in the image), and if the face is at the correct angle (e.g., forward-facing).

Typically, only a single forward-facing image is required for mapping (although in some cases, partial images may be used, with supplementing logic filling in missing information by extrapolation). However, multiple images may be used to provide different angles and allow the user to turn their head while the mask is applied.

In some embodiments, the image searching, filtering, and selection aspects may be performed by a remote server in order to conserve local resources on a client device. Optionally, a client device may generate a mask from the image. Mask generation may involve: (1) extracting facial features from the image, (2) mapping the facial features to the user's video, (3) blending/recoloring of either or both of the image or the person's face, and (4) applying the mask in real-time/on the fly. This device-centric implementation allows for dynamic creation of masks in real time (e.g., as a video is recorded and/or played).

In addition to, or alternatively from, using images of humans, the process described above may be used to map any type of image to a face. For example, facial overlays of animals, such as dogs or cats, or other types of images may be used.

In some embodiments, the masks may be used to provide a karaoke experience and/or gesture-based music track generation as described for example in U.S. patent application Ser. Nos. 15/810,505 and 15/810,536, filed on Nov. 13, 2017.

Using the technology described herein, a user may request that a media effect be generated for a particular celebrity or public figure. Even if no pre-generated media effect exists to allow for such an overlay to be applied to the user's video feed, a custom media effect may be generated for the specified entity by conducting a search of publicly available images. Similarly, the user's own private photos (e.g., on a mobile device or social network) may be used to generate a custom media effect. Thus, the user need not rely solely on pre-generated media effects produced by third party media effect administrators.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

FIG. 1A depicts an exemplary facial overlay 100 to be applied to a face of a user. The facial overlay 100 may be made up of one or more images of a face to be mapped to, and overlaid onto, the face of a user (e.g., in a video communication). In the case of a single facial image making up the overlay, it may be advantageous to utilize a front-facing image (e.g., an image looking as directly as possible into the camera). A user onto whom the overlay 100 is mapped is likely to be interacting with a camera, e.g. in a video call, and hence is likely to be looking directly at the camera. Thus, by using a front-facing image for the overlay, the perspective of the overlay is consistent with the perspective of the user. The perspective of the overlay 100 may nonetheless vary by application; in situations in which the user is expected to be interacting with the camera from a different angle (e.g., from the side), a suitable default overlay perspective may be used.

In the case of multiple images making up the overlay, it may be advantageous to include a front-facing overlay, as well as images taken from other perspectives that are likely to be adopted by the user. For example, during a video recording the user may look slightly to the left or the right, may nod their head, or may turn to the side. Including overlay images from each of these perspectives may allow for a more seamless effect. In some cases, when a user transitions from one perspective (e.g., front-facing) to another (e.g., side-facing), overlay information from two or more images may be extrapolated in order to generate perspectives in between these two extremes. For example, if a front-facing overlay image is available and a side-facing overlay image is available, data from both of these overlays may be used to extrapolate appropriate overlay information for mapping the overlay 100 to the user's face when the face is at, e.g., a forty-five degree angle.

Alternatively or in addition, the overlay 100 may represent a three-dimensional model that may be mapped to the user's head. This embodiment has the advantage of allowing for a more seamless overlay even as the user's face moves between many different angles. On the other hand, generating such a model typically requires more a priori work than mapping an image to a face.

Figure 1B:
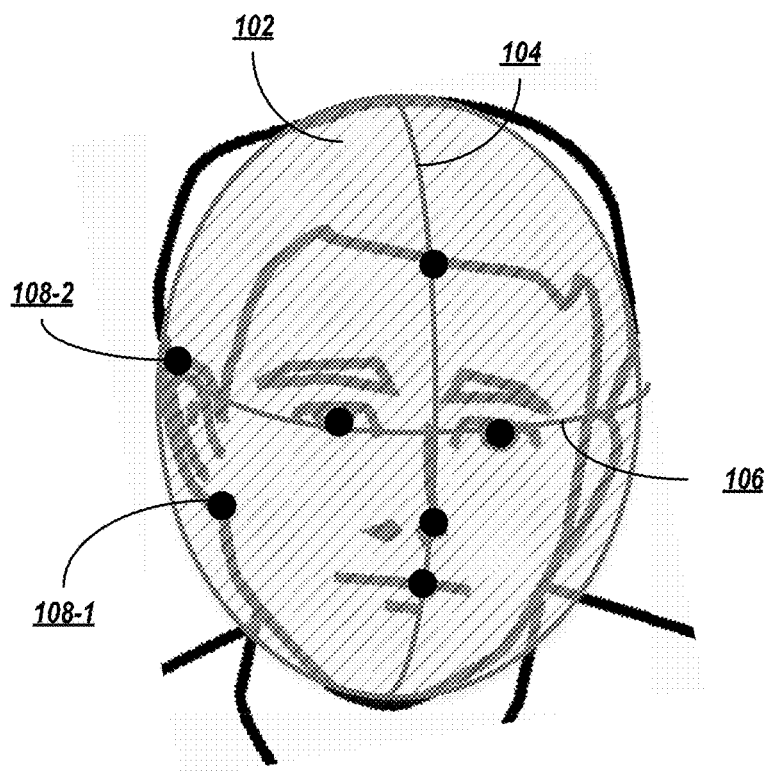
FIG. 1B depicts the facial overlay of FIG. 1A with particular facial features pinpointed.

In addition to the facial image(s) or model(s), the facial overlay 100 may include metadata for facilitating positioning, scaling, etc. the facial overlay 100 onto a video including the face of a user. For example, FIG. 1B depicts several such examples of metadata.

The metadata may include an oval or other shape 102 substantially corresponding to the shape of the face in the overlay 100. A similar shape may be dynamically generated on the face of the user to whom the overlay is to be applied. By matching the shape 102 to the shape overlaid onto the user's face, the overlay 100 may be more readily applied to the user's face in real time. The shape may include axes 104, 106 extending through the center of the face and/or aligning with certain features (e.g., the user's eyes, nose, etc.) The axes may be aligned in real time to similar axes dynamically generated on the face of the user.

The metadata may further include points of reference 108-*i* on the facial overlay 100. The points of reference 108-*i* may represent locations of certain features (e.g., top of the ear 108-2, bottom of the ear 108-1, tip of nose, center or edges of mouth, center of brow line, center of eyes etc.) which may be aligned with corresponding points on the face of the user.

Any or all of the metadata may be used to position the overlay on the face of the user in a video, to stretch or scale the overlay 100 or portions of the overlay 100 so that it fits on the user's face (although limits may be enforced to avoid overly distorting the overlay 100), or to extrapolate information to allow the overlay 100 to be applied to the user's face at different angles.

The metadata may be generated automatically (e.g., by algorithmically analyzing the image(s) making up the overlay 100), and/or may be applied manually by a user or administrator.

Figure 1C:
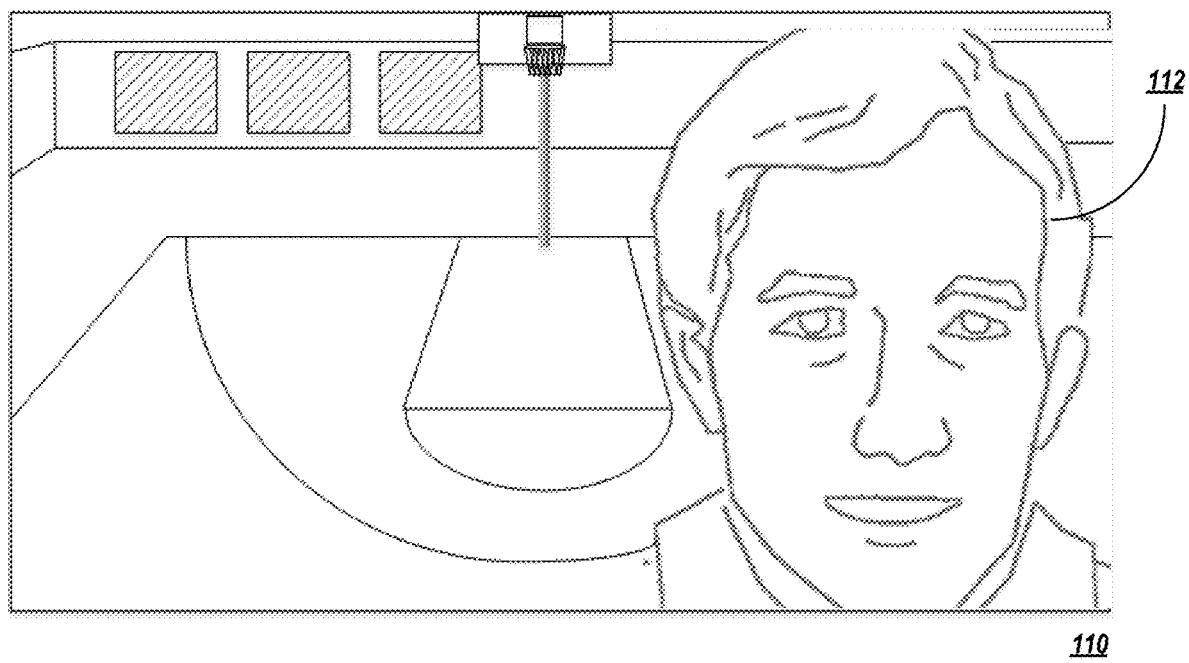
FIG. 1C depicts an exemplary video interface including a face of a user.
Figure 1D:
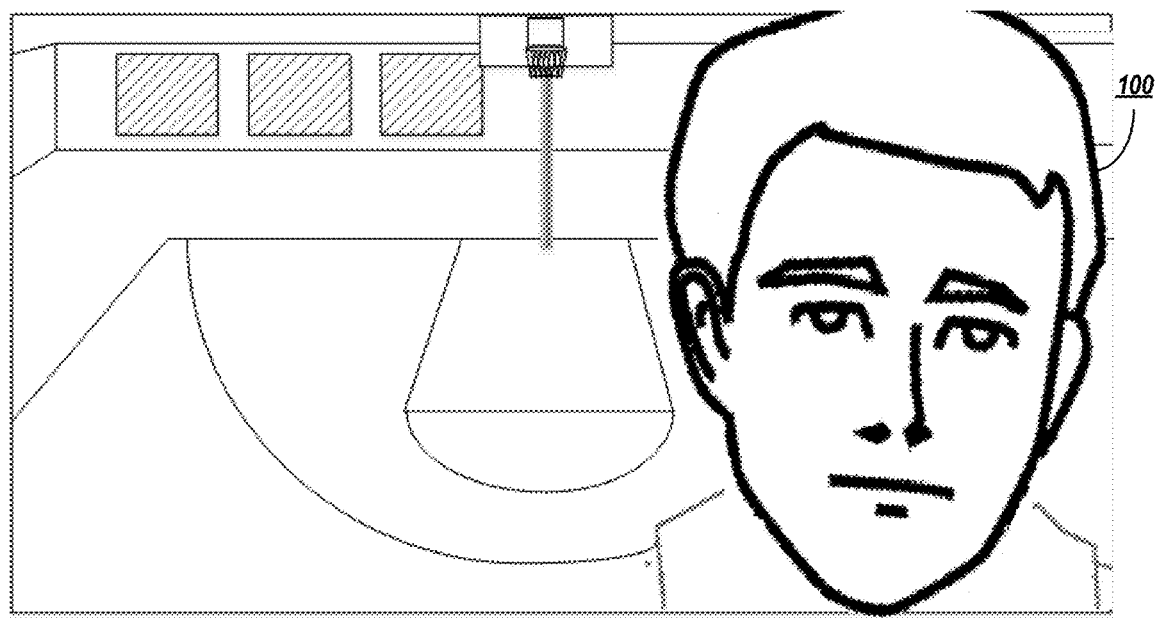
FIG. 1D depicts the facial overlay of FIG. 1A applied to the video interface of FIG. 1C.

The overlay 100 may be applied over the face 112 of a user in a video, such as a prerecorded video, real-time video communication, etc., as shown in FIGS. 1C-1D. FIG. 1C depicts an example of a video interface 110 in which a user's face 112 appears. FIG. 1D depicts the video interface 110 with the overlay 100 overlaid on the user's face.

According to exemplary embodiments, the overlay 100 may represent a celebrity, such as a singer, and may be overlaid onto a user's face as part of a karaoke performance (e.g., a performance of a song associated with the singer). The karaoke performance may be performed in a dedicated karaoke application, or as a secondary feature in another application, such as an application supporting video conversations or other features. The karaoke performance may be conducted in connection with a group video interaction, or may be performed in a solo video performance.

Figure 1E:
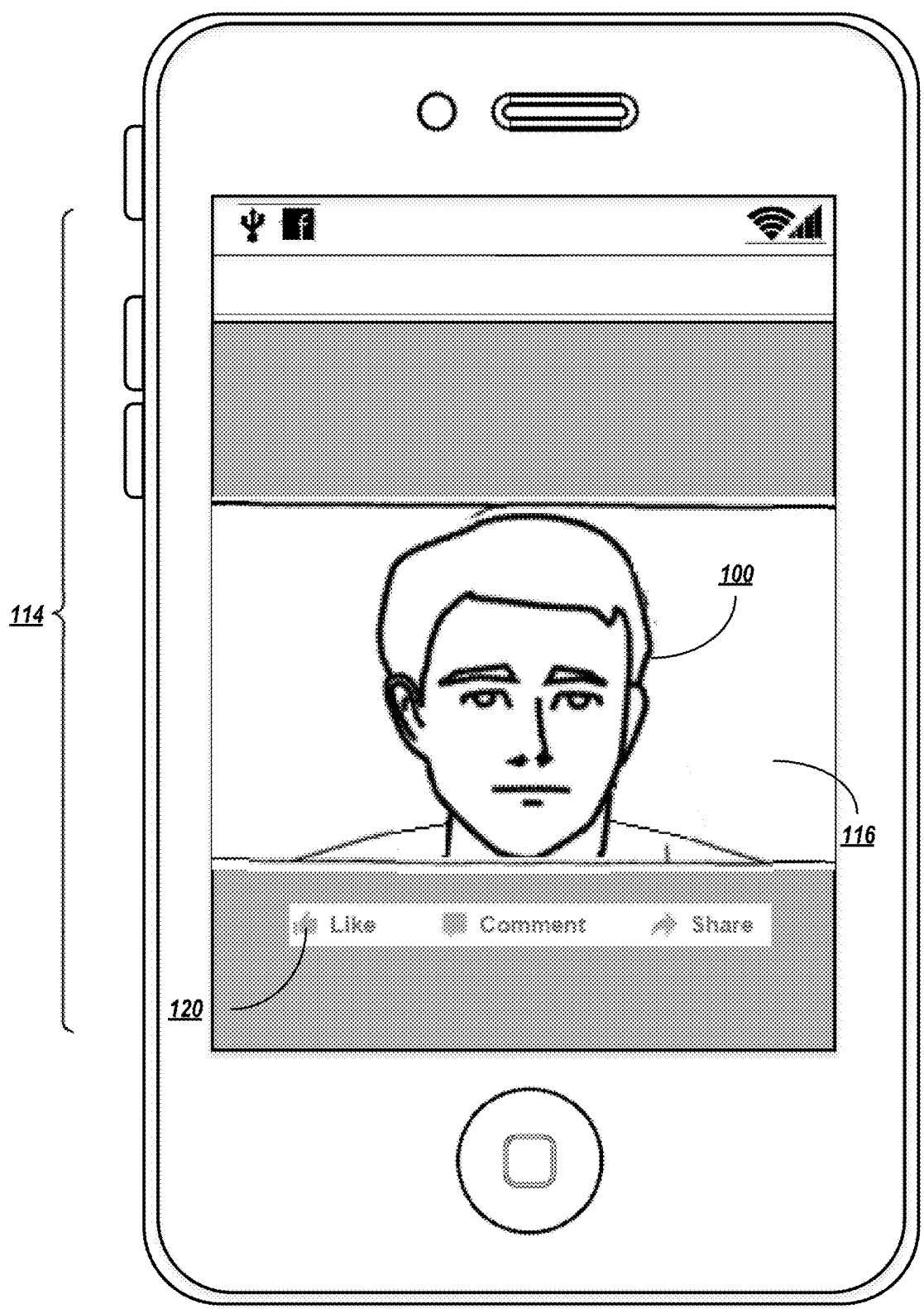
FIG. 1E depicts an exemplary interface for karaoke performance in accordance with an exemplary embodiment.

FIG. 1E depicts an exemplary interface 114 for karaoke performance in accordance with an exemplary embodiment. The interface 114 may be presented as part of a real-time video communication (e.g., a video call), a standalone karaoke application, a social networking site, etc.

Figure 2A:
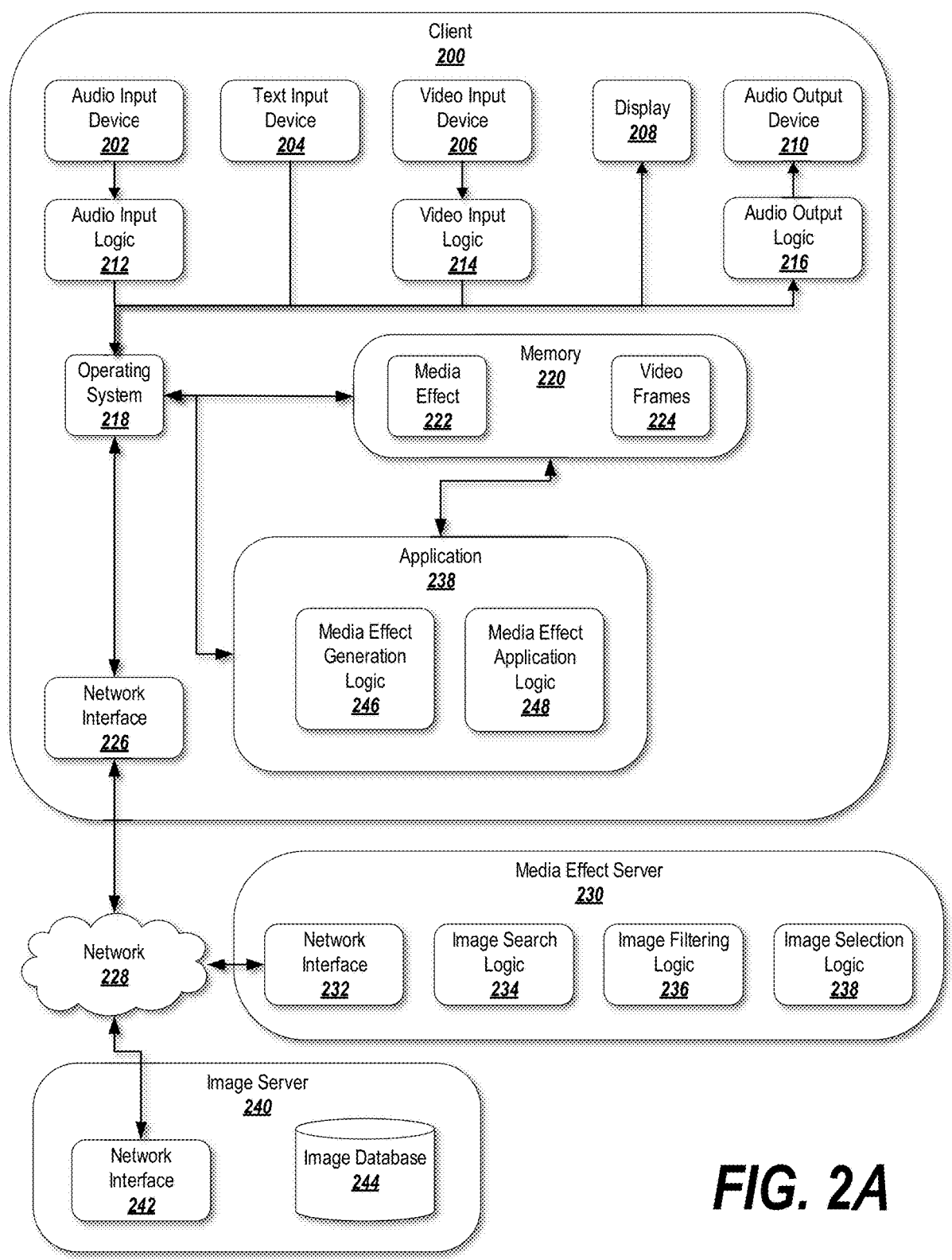
FIG. 2A is a block diagram depicting an exemplary client/server environment suitable for use with exemplary embodiments.

The interface 114 may include a video feed 116 in which a user's face is present. Facial recognition/detection logic may analyze the frames of the video feed 116 to identify the location and/or dimensions of the user's face. An overlay 100 may be applied to the user's face. These steps may be performed locally at the user's client device (or at the client device of a recipient of the video), or remotely at a server device. In the former case, the overlay 100 may be applied by a karaoke or communications application that receives a video stream from the client device and applies the overlay using suitable logic; such an example is depicted in FIG. 2A. In the latter case, the video stream may be transmitted from a client device to a communications server for distribution to one or more recipients; the overlay 100 may be applied by the communications server or by a different support server.

During the performance, the facial detection logic may identify movement by the features of the user's face, and may alter the overlay 100 accordingly. For instance, when the user opens their mouth, the overlay 100 may be modified so that the mouth on the overlay 100 is also opened to a degree corresponding to the user's. Other features, such as eyes, eyebrows, etc. may also be tracked and reflected on the overlay.

In some embodiments, the device applying the overlay may also or alternatively apply facial detection logic to identify regions of the video feed 116 that do not correspond to the face of the user (e.g., the background of the video) and may replace the regions not corresponding to the face with different items, similar to the effect of a green screen. For example, while performing a karaoke number, the background may be altered to resemble an arena with cheering fans, or with a background thematically appropriate to the song being performed.

Other information may also be displayed in the display. For example, the display may include information about the song being performed such as the title, artist, album name, release date, etc. The song's lyrics may be displayed, and certain lyrics may be visually distinguished in time with the progress of the song in order to allow the user to follow along.

The interface 114 may vary depending on the role of the user. For example, the user performing the song may see an interface that includes the song lyrics, whereas the song lyrics may be omitted on the interface of a user who is merely viewing the performance. The viewer may see, for example, certain interaction elements 120 allowing the viewer to engage with the video feed 116 (e.g., by "liking" the feed, commenting on the feed, or sharing the feed with other users).

The facial overlay 100 may be obtained by using a private or public image search. An exemplary configuration for a client/server environment for generating such an overlay 100 is next described with reference to FIG. 2A.

Exemplary System Configuration

FIG. 2A is a block diagram depicting an exemplary facial overlay generation system suitable for use with exemplary embodiments.

A client 200, such as a mobile device, may be used to record a video and/or play an audio/video feed. The client 200 may be, for example, a computer, a mobile device, a special-purpose karaoke or music generation device, or any other suitable client device.

The client 200 may include an audio input device 202, such as a microphone. The audio input device 202 may record audio in the vicinity of the client device and forward the recorded audio to audio input logic 212 for processing. The audio input logic 212 may process the recorded audio, potentially with the assistance of the sound analysis logic 244 discussed below. The audio input logic 212 may, for example, perform speech-to-text processing, analyze tone and/or pitch in the audio, etc.

The client 200 may further include a text input device 204, such as a physical or on-screen keyboard for entering text.

The client 200 may include a video input device 206, such as a camera capable of recording video. Video input logic 214 may process incoming video, for example to be used by the karaoke logic 240 and/or the gesture logic 248.

The client 200 may include a display 208, such as a touch screen or other display device. The display 208 may display a karaoke interface, video call, etc., as depicted in FIGS. 1A-1E.

The client 200 may include an audio output device 210, such as a speaker or audio output jack. The audio output device 210 may play a karaoke track and/or triggered musical elements. The audio output device 210 may receive the audio through audio output logic 216, which may work in conjunction with the operating system 218 and/or an application 238 to provide a karaoke and/or gesture-based music experience.

Any or all of the audio input device 202, the text input device 204, the video input device 206, the display 208, and the audio output device 210 may be integrated with the client 200, or may be provided externally to the client 200 and connected to the client 200 in a wired or wireless manner. These devices may also be used to support a communications application, such as an application for making video calls or a social networking application.

An operating system 218 may support the client 200, and may coordinate and/or control the audio input device 200, the text input device 204, the video input device 206, the display 208, the audio output device 210, a memory 220, an application 238, and/or a network interface 226.

The memory 220 (e.g., RAM, ROM, etc.) may store data structures for use by the application 238 and/or the operating system 218.

For example, the memory 220 may store a media effect data structure 222 and one or more video frames 224 from a video stream. The video stream may be, for example, a video call, a game having a video element, a karaoke video feed, etc. The video frames 224 may include a face, which may be replaced by an overlay as described by the media effect 222. The media effect may include data allowing the overlay to be generated dynamically (e.g., in real time or "on the fly"), as the video frames 224 are received in the memory 220. The media effect 222 is described in more detail with reference to FIG. 2B.

The client 200 may execute an application 238 capable of generating and/or applying media effects. The application 238 may be general-purpose application that generates a media effect, records a video feed, overlays the media effect on the video feed, displays a karaoke interface, etc. These capabilities may also be split between multiple applications 238. The application 238 may be a special-purpose karaoke or music-generation application, or may be a communication, social networking, or other type of application that incorporates karaoke and gesture-based music capabilities.

To generate and apply the media effect, respectively, the application 238 may include media effect generation logic 246 and media effect application logic 248. These logics 246, 248 are described in more detail in FIG. 4B. The application 238 may further support karaoke logic configured to generate a karaoke interface, such as the interface depicted in FIG. 1E. The karaoke interface may cause the display 208 to display a rendering of a facial overlay mapped to the face of the user during the karaoke performance, as described above. Alternatively or in addition, the application 238 may support videoconferencing logic allowing a user of the client 200 to participate in a video conversation. Still further, the application 238 may support video recordings, allowing the media effect 222 to be applied to a video that is stored or transmitted.

The application 238, memory 220, and I/O devices may communicate, through the operating system 218, with a network interface for communication on a network 228, such as the internet. The network interface 226 may be, for example, a network interface card (NIC) or other suitable hardware and/or software for managing network transmissions and receptions.

The client 200 may, through the network interface 226, communicate with a corresponding network interface 232 on a media effect server 230. The media effect server 230 may support certain aspects of generating the media effect 222, such as searching for images to be used in the media effect 222 (via image search logic 234), filtering the images to remove images unsuitable for use in a media effect 222 (or preferentially selecting images well-suited to use in a media effect 222) via image filtering logic 236, and selecting images discovered in the image search for application to the media effect (via image selection logic 238). The various logics 234, 236, 236 are described in more detail with reference to FIGS. 4A-4B.

The media effect server 230 may conduct a search for images in an image database 244, which may be hosted locally at the media effect server 230 or may be hosted remotely, on an image server 240. In the latter case, the media effect server 230 may transmit an image search request over the network 228 to a network interface 242 of the image server 240, and may receive the image search results via its own network interface 232.

Thus, a user may request, for example, that a media effect be generated for a particular celebrity or public figure. Even if no pre-generated media effect 222 exists to allow for such an overlay to be applied to the user's video feed, using the logics of the application 238 and/or the media effect server 230, a custom media effect 222 may be generated for the specified entity. Similarly, if the image database 244 is a private database (such as might exist on a user's mobile device or on a social networking server), the user may generate a custom media effect 222 from their own photographs.

Any or all of the above-described logic may be executed via instructions on one or more hardware processors. The instructions may be stored on a physical non-transitory computer-readable storage medium.

It is noted that, although the logic and data structures are depicted in a particular configuration in FIG. 2A (with some on the client 200 and others on the server 230), other configurations are also contemplated in connection with the present invention. The depicted configuration divides the operations so that image searching, filtering, and selection is performed at the server. This may allow resources to be conserved at the local device, which may have limited memory, storage, and network transmission resources, and which may therefore not be well-suited to processing large amounts of data transmitted over a network (as might be done when filtering through a large amount of data. Nonetheless, this logic may be moved to a remote device, such as the media effect server 230, or a separate server (such as a video conferencing server, a karaoke server, etc.). Nonetheless, this logic may be moved to the client 200, allowing the application 238 to perform these tasks without relying on remote resources.

Meanwhile, in FIG. 2A mask generation and application are handled at the client device (e.g., the location where the video frames 224 are being recorded via the video input device 206), which allows for faster mask/overlay application. Accordingly, media effects can be generated in real-time, without the need to transmit portions of the video to a remote server to allow the remote server to apply the media effect. This also conserves network resources, since only the "final" video (with the overlay already applied) needs to be transmitted.

Nonetheless, this logic may be moved to a remote device, such as the media effect server 230, or a separate server (such as a video conferencing server, a karaoke server, etc.). Particularly if the client 200 has relatively fewer processing resources, such an embodiment may allow for more elaborate or detailed media effects to be applied than might be possible using only the limited resources of the client 200.

For example, the media effect generation logic 246 and/or media effect application logic 248 may reside on the server 230, which may receive a video feed from the client 200 through the network 228 and may process the video using the logic 246, 248 in order to generate a karaoke performance video and/or video call interface. The output of the logic 246, 248 may be transmitted back to the original client 200 and/or to any viewers of the video/audio.

Alternatively or in addition, the image database 244 may be stored on the client 200 (e.g., in a photo album on the user's phone, allowing the user to use private photographs for generating the media effect 222), or at least a portion of these libraries may be cached at the client 200.

Figure 2B:
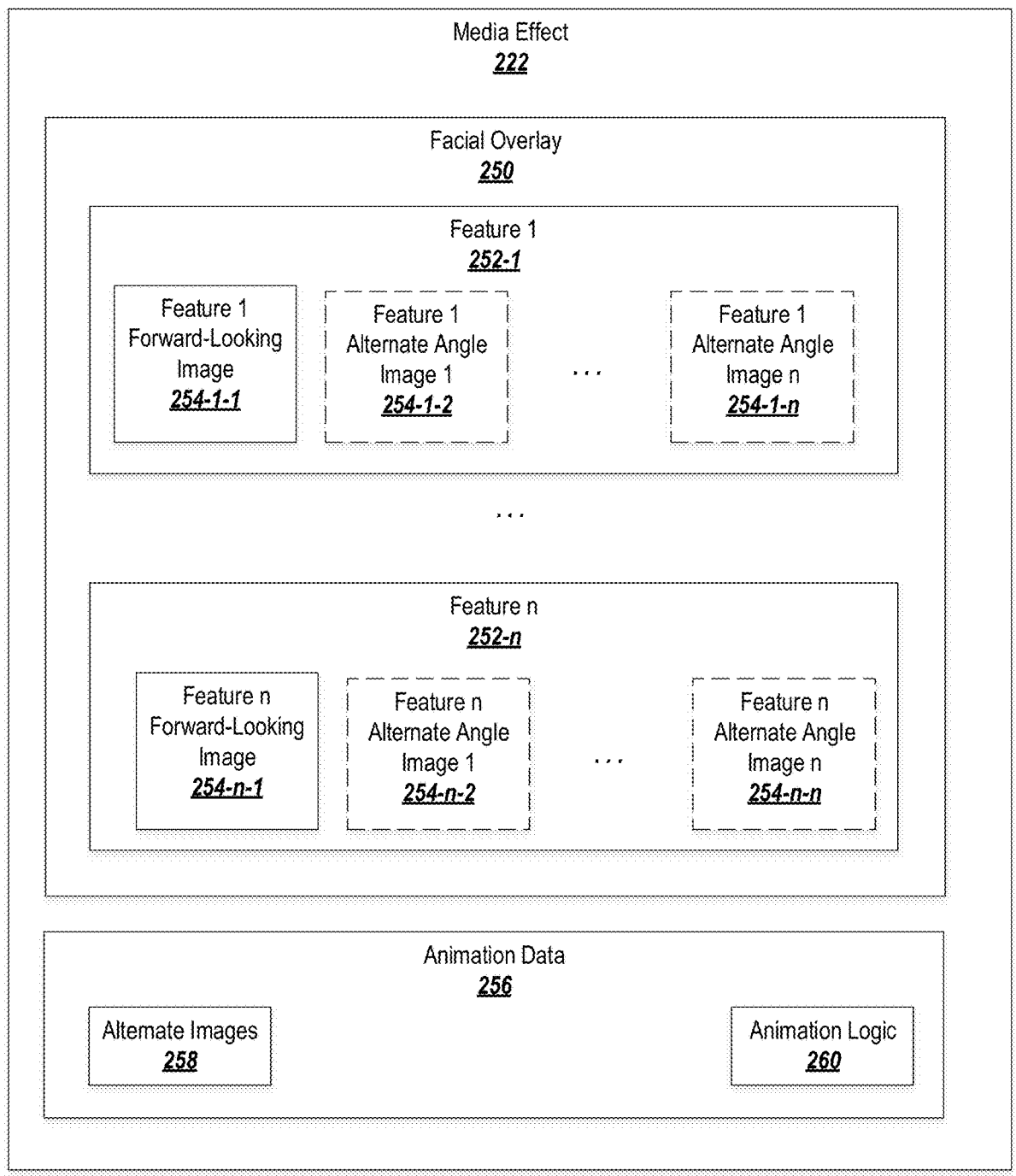
FIG. 2B depicts an exemplary data structure for a media effect.

FIG. 2B depicts an example of a media effect data structure 222 suitable for use as a facial overlay.

The media effect 222 may include a facial overlay 250 made up of one or more features that allow the media effect 222 to be rendered on a video, and animation data 256 describing modifications to the media effect 222 that allow various features of the media effect 222 to be animated once they are rendered.

The facial overlay 250 may include data for one or more features 252-$i$. The features 252-$i$ may describe various portions of the face used in the overlay 250, such as a region encompassing the mouth, eyes, nose, ears, etc. The features 252-$i$ may be made up of one or more images 254-$i$-$j$.

Each feature 252-$i$ may include at least a forward-looking image 254-$i$-1, which may be an image facing substantially directly into the camera. Because a user is likely to be looking directly into a camera for most of the time that a video is recorded (in the case of a video call and/or karaoke performance), it may be important to have access to at least one feature set that is facing substantially directly into the camera. In this case, a face may be considered to be looking substantially directly into the camera if the camera is pointing directly into the face, or if the face is angled by at most a predetermined small angle (e.g., 5°) away from center (in any direction, such as left, right, up, or down; tilting the head to one side or the other may be addressed by rotating the image and as such may not be a cause for concern) such that the features of the face would appear natural when superimposed on a forward-looking face in a video.

The direction of the face in the image may be determined in a number of ways; according to one embodiment, axes may be defined as shown in FIG. 1B based on the position of the eyes, mouth, chin, etc., and the axes may be analyzed to determine whether the face is in a substantially forward-looking direction.

In addition to the forward-looking image 254-*i*-1, the features 252-*i* may also include one or more images 254-1-*j* (j>1) at alternate angles. These images may be used to superimpose features on the face in the video if the face should rotate or turn to face substantially the same angle as in the images from which the alternate angle images 254-1-*j* were captured. Accordingly, each alternate angle image 254-1-*j* may include a tag, metadata, or other identifier indicating the estimated angle or angle range (e.g., as determined by analyzing the facial axes as described above) at which they should be applied. As the face in the video rotates from a first angle for which a first feature image exists to a second angle for which a different second feature image exists, animation logic 260 may be applied to extrapolate intermediate images between the first feature image and the second feature image, in order to create a more seamless effect.

The features (eyes, mouth, etc.) required to create a given media effect may be predetermined so that such features can be extracted from images, as described herein. In some cases, a creator of a media effect template may opt to omit certain features that may be difficult or time consuming to render in a karaoke performance. For example, the media effect 222 may include data allowing new hair to be overlaid onto the user's face, but may omit the mouth from the feature data, since it may be difficult to accurately render an overlaid mouth as the user is (e.g.) engaging in a video conference or karaoke performance.

Alternatively, the media effect may include alternate images 258 of a feature (such as the mouth) that supplement the images contained in the facial overlay 250. For example, the facial overlay 250 may include feature data 252-*i* for the mouth, which shows the mouth closed (e.g., a closed mouth at a forward-facing angle and one or more alternate angles). The alternate images 258 may include images of the mouth at the forward-facing angle and/or the alternate angles, but the mouth may be at varying stages of openness. The animation logic 260 may be applied to select between different images of the mouth depending on how far the user's mouth is open in the video and/or based on an analysis of the sound in the video.

As yet another alternative, the images from the image search may be used to build a 2D or 3D model of a particular feature, which may then be animated by the animation logic 260.

Data Flow and Exemplary Methods

Figure 3:
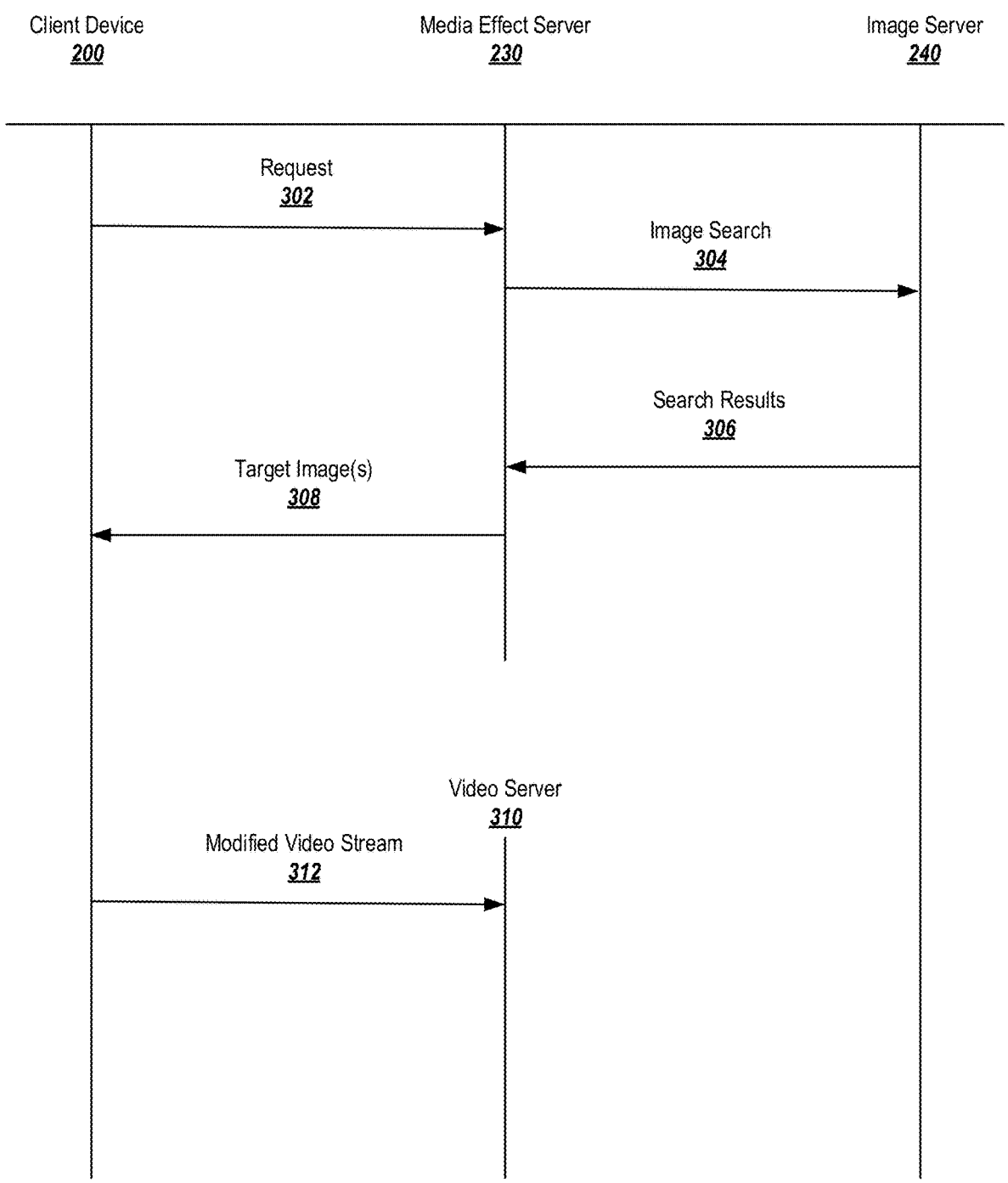
FIG. 3 is a data flow diagram depicting exemplary information exchange in a client/server environment.

FIG. 3 depicts an exemplary data flow diagram depicting information exchange among various devices, such as those depicted in FIG. 2A.

A user of a client device 200 may submit a command to generate a custom media effect, such as a mask, via an interface of an application on the client device. The application may, for example be a video conferencing application, a messaging application, a social networking application, a karaoke application, or a dedicated media effect generation application. The command may identify an entity, such as a celebrity, public figure, etc. for which the media effect should be generated. The identification may be in the form of a name, a description, a photograph, or any other way in which an individual entity may be uniquely or probabilistically identified. In some embodiments, the user may submit a desired image that is to be used to generate the mask as part of the command (in which case, the image search described below may be omitted). Based on the identification in the command, the client device 200 may generate a request 302 identifying the entity and transmit the request 302 to the media effect server 230.

The media effect server 230 may analyze the request to retrieve the identification of the entity and may initiate an image search on an image server 240. Accordingly, the media effect server 230 may formulate an image search request 304 according to the conventions of the image server 240. The image search request 304 may optionally specify a number of images to be returned. The media effect server 230 may transmit the image search request 304 to the image server 240.

Upon receipt of the image search request 304, the image server 240 may conduct an image search and may return a set of search results 306. The search results 306 may include images containing the entity identified in the request 302. The search results 306 may include the actual images found as a result of the search, image addresses or pointers to the images, or an image thumbnail with location information allowing a higher-resolution and/or larger version of the image to be retrieved. If the search request 304 specified the number of images to be returned, the search results 306 may return up to that number of images.

The media effect server 230 may analyze and filter the images, as described in more detail in connection with FIGS. 4A-4B. Based on this analysis, a number of target images 308 may be identified that are suitable for being turned into a media effect. The target images may include at least one forward-facing image of the face of the entity identified in the request 302. The target images may optionally also include one or more images of the face of the entity at different angles.

Using the target images 308, the application of the client device 200 may generate a media effect and may apply the media effect in real time to a video recorded at the client device. The result may be a modified video stream in which the media effect is superimposed over the face of the user in the video. This may be achieved by modifying the visual data of the video and pairing the modified visual data with the original audio data of the video. The resulting modified video stream 312 may be transmitted to a video server 310 (such as a video conferencing server, a messaging server, a social networking server, or a karaoke application server), e.g. for retransmission to one or more target recipients.

Next, exemplary logic 400 for generating and applying the media effect based on an image search are described in connection with FIGS. 4A-4B. FIGS. 4A-4B use the conventions established in FIG. 2A with respect to describing the image search logic 234, the image filtering logic 236, the image selection logic 238, the media effect generation logic 246, and the media effect application logic 248. In some embodiments, these logic modules may be distributed as shown in FIG. 2A, although it is understood that such a configuration is not required. All of the modules may be implemented in the same device, or may be distributed across any number of devices. Various combinations of modules may be employed on a given device, or the logic of an individual module may be performed by different devices.

Processing may begin at block 402, at which a request (such as the request 302 described in connection with FIG. 3) may be received. The request may identify an entity for which a media effect should be generated.

The request may be provided to image search logic 234. The image search logic 234 may, at block 404, generate an image search request to instruct a device to search an image database or repository. The image search request 304 may be, for example, in the form of an application programming interface (API) call or a hypertext transfer protocol (HTTP) command to an image server. The image search request may identify the entity specified in the request received at block 402.

At block 406, the image search request generated in block 404 may be submitted to the image database or repository. An image search may be conducted according to known techniques for retrieving images associated with the entity identified in the request. In response to the request, image search results may be received in block 408.

The image search results identified by the image search logic 234 may be provided to image filtering logic 236. The image filtering logic 236 may begin at block 412, when the first image from the image search results is selected for analysis.

At block 414, the logic 236 may apply an initial filter to determine whether the returned image contains a face. For example, facial detection logic may identify a face in the image. If no face is located, then at block 416 the image may be discarded without further consideration and processing may return to block 410.

If a face is detected at block 414, one or more additional filters may be applied to determine if the image is suitable for use as a media effect and/or to assign a score indicating how well-suited the image may be to application as a media effect.

For example, at block 418, the system determines if the face in the image is sufficiently large to extract features that would be used in the media effect (e.g., whether the face in the image is above a predetermined threshold size). If the face is too small, the individual features may not contain sufficient detail when applied over a user's face in a video stream, resulting in a low-quality media effect. If the face is determined to be too small at block 418, processing may return to block 416 and the image may be discarded without further consideration. If the face is determined to be sufficiently large, then the system may assign a weighted score to the image based on the face's size (e.g., the larger the face, the higher the score). Faces that are relatively large may result in better, more detailed masks, and are therefore assigned a higher score.

A similar but separate consideration is the resolution of the face in the image. If the face is sufficiently large but the resolution is too low, then details of the facial features may be present in the image but may be distorted. Accordingly, if the resolution of the face is below a predetermined threshold, then at block 420 the system determines that the image is not suitable, and processing returns to block 416 where the image is discarded. On the other hand, if the resolution is sufficient, then the weighted score for the image may be adjusted based on the resolution of the face in the image (the higher the resolution, the higher the resulting score).

At block 422, the system may determine if one or more facial features are missing from the image. For example, if the image is cropped so that the face's hair, chin, ears, etc. are not visible, then the system may determine that the image is not suitable for use as a media effect. Processing may return to block 416 and the image may be discarded. In some cases, the system may accept some loss of feature information, which may be supplemented and/or extrapolated for use in the media effect. For example, the image may be combined with other (potentially partial) images from the image search that contain the missing features. Alternatively or in addition, the features may be extrapolated from information that is present in the image and/or average features may be applied. The score may be adjusted based on whether some features are missing (assuming that the image can still be used to generate a media effect). If all features are present, the score may remain the same; if some non-essential features are missing but can be supplemented or extrapolated, the score may be lowered by an amount corresponding to the degree to which information is missing from the image.

At block 424, the system may determine if the face in the image is facing forward (i.e., directly into the camera). The system may tolerate some threshold amount of deviation from forward facing (in which case the score for the image may optionally be lowered). If the image is forward-facing, the image may be selected for use as a primary image (i.e., the forward-facing image for use by the media effect) at block 426. As the system processes more and more images, multiple images of varying quality may be added to the primary list.

If the image is not forward facing but nonetheless passes the other filters, the image may be tagged with the angle of the face to the camera, and the image may be added to a list of secondary images at block 428.

Although a number of filters are described in connection with block 236, other filters may also or alternatively be applied, and/or the score may be adjusted (based on, or independently from, the filters). For example, a filter may be applied and/or the score may be adjusted based on lighting conditions, the age of the image (with more recent images being preferred unless the original request at block 402 specifies a different target time period for the images), a confidence level based on how confident the image searching algorithms are that the image contains the entity specified in the request, etc.

Block 236 may operate on a predetermined number of images. For example, the search request issued at block 406 may specify a maximum number of images to be returned, and the image filtering logic 236 may process the number of images specified in the request (or as many images as were returned, if less than the specified number were returned). Alternatively or in addition, the image filtering logic 236 may retrieve one or several images at a time from the image search logic, and may only break out of the loop at block 410 when at least one forward-facing image of sufficient quality (e.g., having a quality score above a predetermined threshold value) is identified. If a number of images at alternate angles or for specified angle ranges are also desired, the loop at block 410 may only be broken after that number of alternate images of sufficient quality are returned. Each time the logic 236 returns to block 412, another image (or several images) may be requested from the image search logic.

From blocks 426 and 428, processing may proceed to block 410 and the system may determine if more images are available for analysis. If so, processing may return to block 412 and the next image may be analyzed. If not, processing may proceed to the image selection logic 238, as depicted in FIG. 4B.

In the image selection logic 238, the highest quality image(s) identified by the image filtering logic 236 may be selected for use in the media effect. At block 430, the system may select the primary image (i.e., a forward-facing image from the list created at block 426) that has the highest score (the weighted score calculated as the filters were applied).

Processing may then proceed to block 432, where it is determined if any alternate images (images that are not forward facing, from the list created at block 428) are available. If not, the primary image may be provided to the media effect generation logic 246.

If so, processing may proceed to block 434, where the angle of each alternate image is determined and the image is assigned to a bucket depending on the angle. The various buckets may specify different ranges of angles that the face may be off-center (e.g., 5-10°, 10-15°, etc.). Because the system may not need more than one image at each angle range, the highest-quality image in each bucket may be selected for use in the media effect at block 436, and processing may proceed to block 246.

The media effect generation logic 246 may generate a media effect (e.g., facial mask) based on the image(s) selected by the image selection logic 244. At block 438, the system may apply facial detection logic to identify regions of the image corresponding to various facial features (e.g., an eye region, a mouth region, etc.). These features may be extracted from the image and, at block 440, added to data structures configured to hold the features (such as the feature data structures 252-*i* of FIG. 2B). At block 442, the various feature data structures that have been created may be packaged into a facial overlay (such as the facial overlay 250 of FIG. 2B), and at block 444 the facial overlay may be packaged (along with any desired animation data) into a media effect.

The resulting media effect may be stored in a storage or transmitted to a device for application to a video stream. Media effect application logic 248 may operate on the video stream to replace a face in the video stream with the face in the media effect.

At block 446, the system may receive a video stream. The video stream may be received, from a video recording device, by an application (e.g., a video conferencing application, a messaging application, a social networking application, a karaoke application, etc.). The media effect may be applied locally, at the device used to generate the video stream. Alternatively or in addition, the video stream may be recorded at a device and then transmitted to a server, with the media effect being added to the video stream by the server.

At block 448, the system may identify one or more facial features in the video. For example, facial detection logic may operate on the frames of the video to identify a face in the frames and to assign various regions of the frames to particular facial features.

At block 450, the system may retrieve a media effect that has been requested to be applied to the video stream. For example, a user may specify, in an interface of the above-noted application, that they wish to appear as a specified entity (e.g., to apply a specified media effect) in the video. The system may retrieve the media effect associated with the specified entity. In some embodiments, it is not necessary that the media effect be generated before video recording commences; in these cases, processing may return to block 402 and the system may generate a new custom media effect for application to the present video stream.

At block 452, the system may optionally determine the angle of the user's face in the video. If the user's face is not directly forward-looking, the system may select alternate features from the media effect for use in overlaying the media effect on the video frames.

At block 454, the system may map the facial features from the media effect (e.g., as shown in FIG. 2B) to the regions of the video frames identified in block 448. The system may then replace the identified regions of the video frames with the mapped features at block 456.

At block 458, the system may blend the outer areas of the features from the media effect with the neighboring regions of the face in the video frames in order to create a more seamless effect. Various color parameters, such as hue, tone, lighting effects, etc., may be blended from the media effect feature to the surrounding regions of the face. In some cases, the overall coloration of the media effect features may be adjusted in order to avoid the need to blend the media effect to the face too drastically.

Optionally, the system may apply animation to the media effect at block 460, such as by animating the mouth in the media effect to move concurrently with the user's mouth in the video.

Blocks 454-450 may repeated as new frames are received in the video, in order to update the video frames based on the movement of the user's face.

Communication System Overview

Figure 5A:
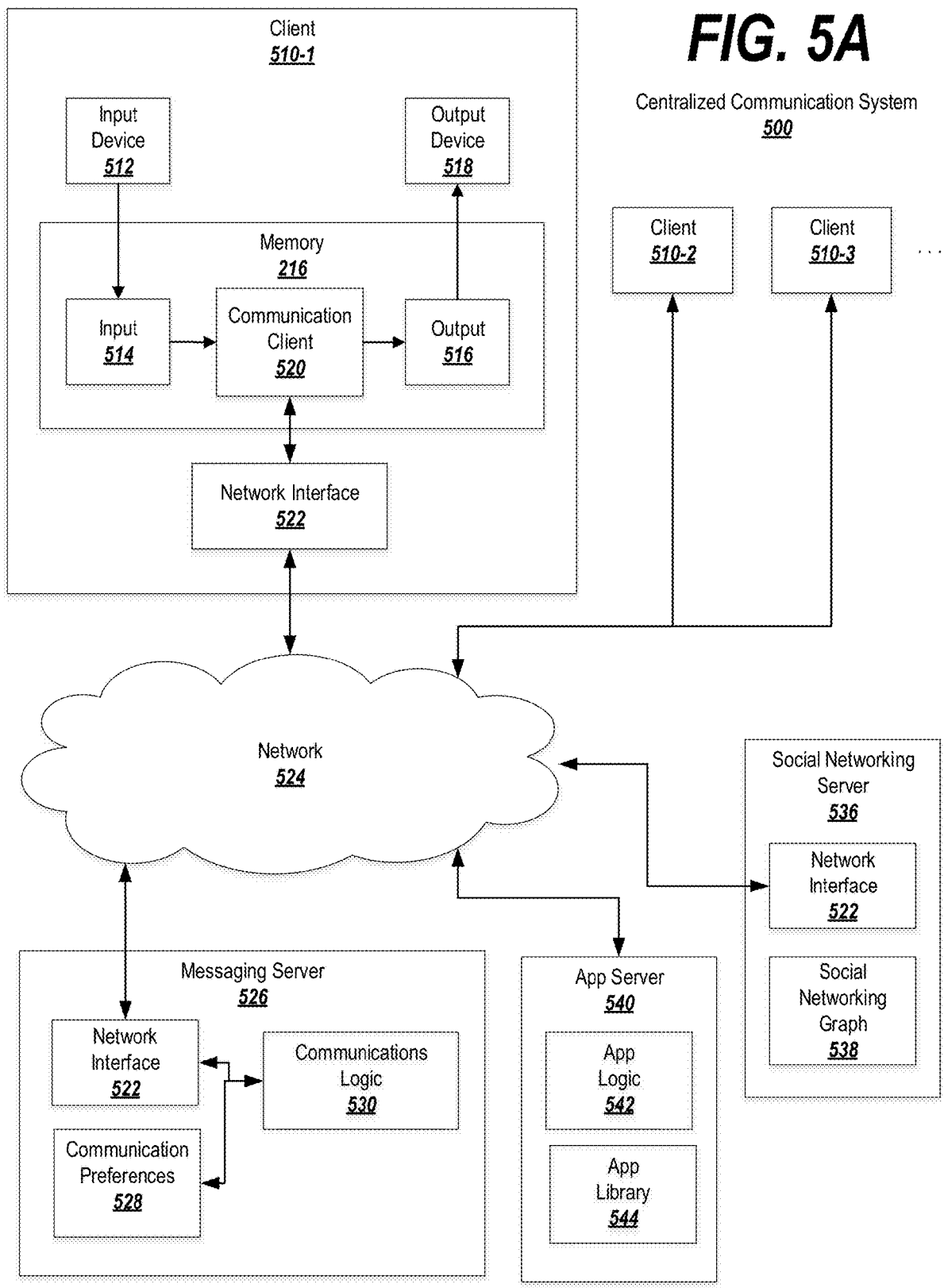
FIG. 5A is a block diagram providing an overview of a system including an exemplary centralized communications service.
Figure 5B:
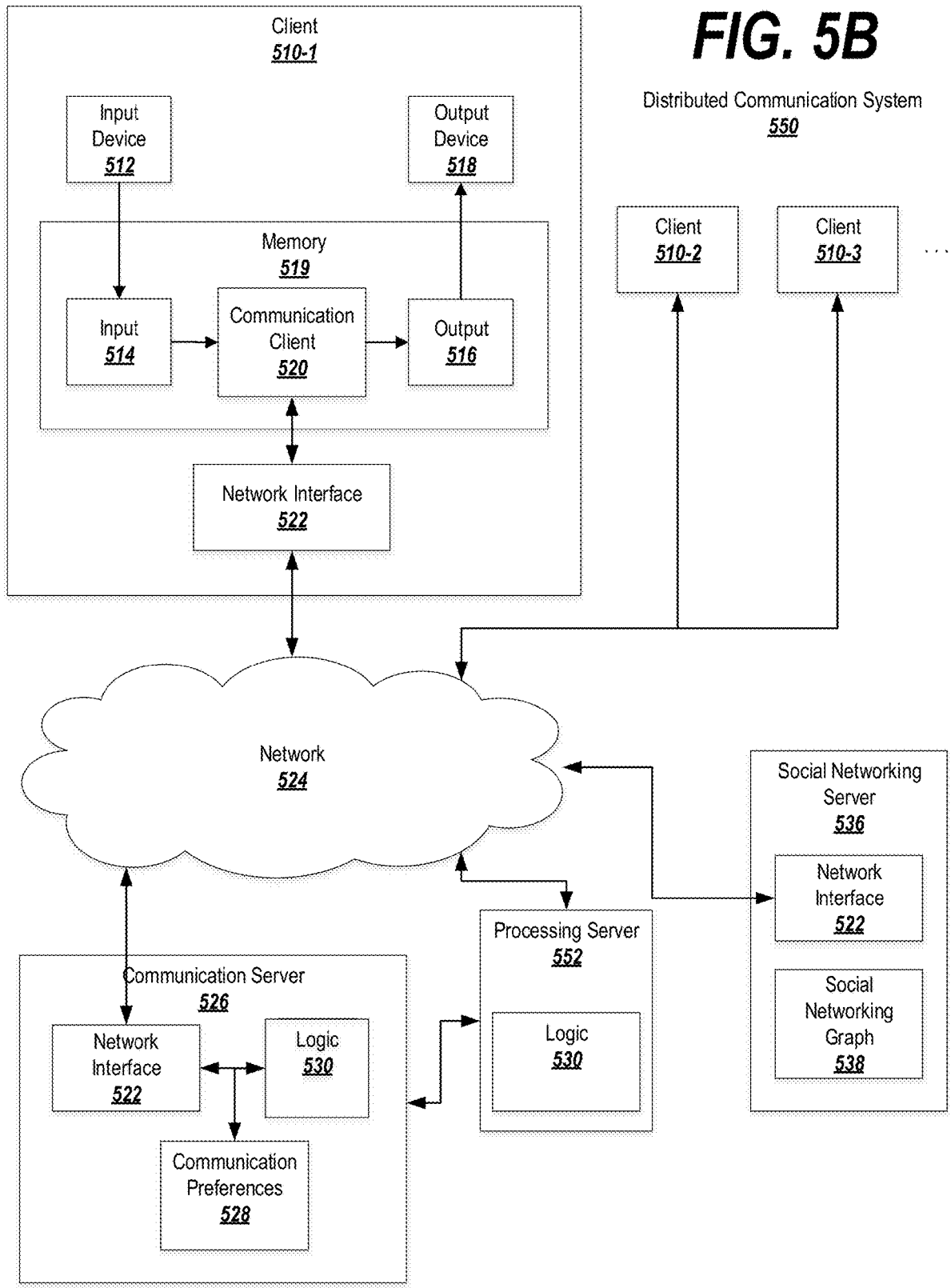
FIG. 5B is a block diagram providing an overview of a system including an exemplary distributed communications service.
Figure 5C:
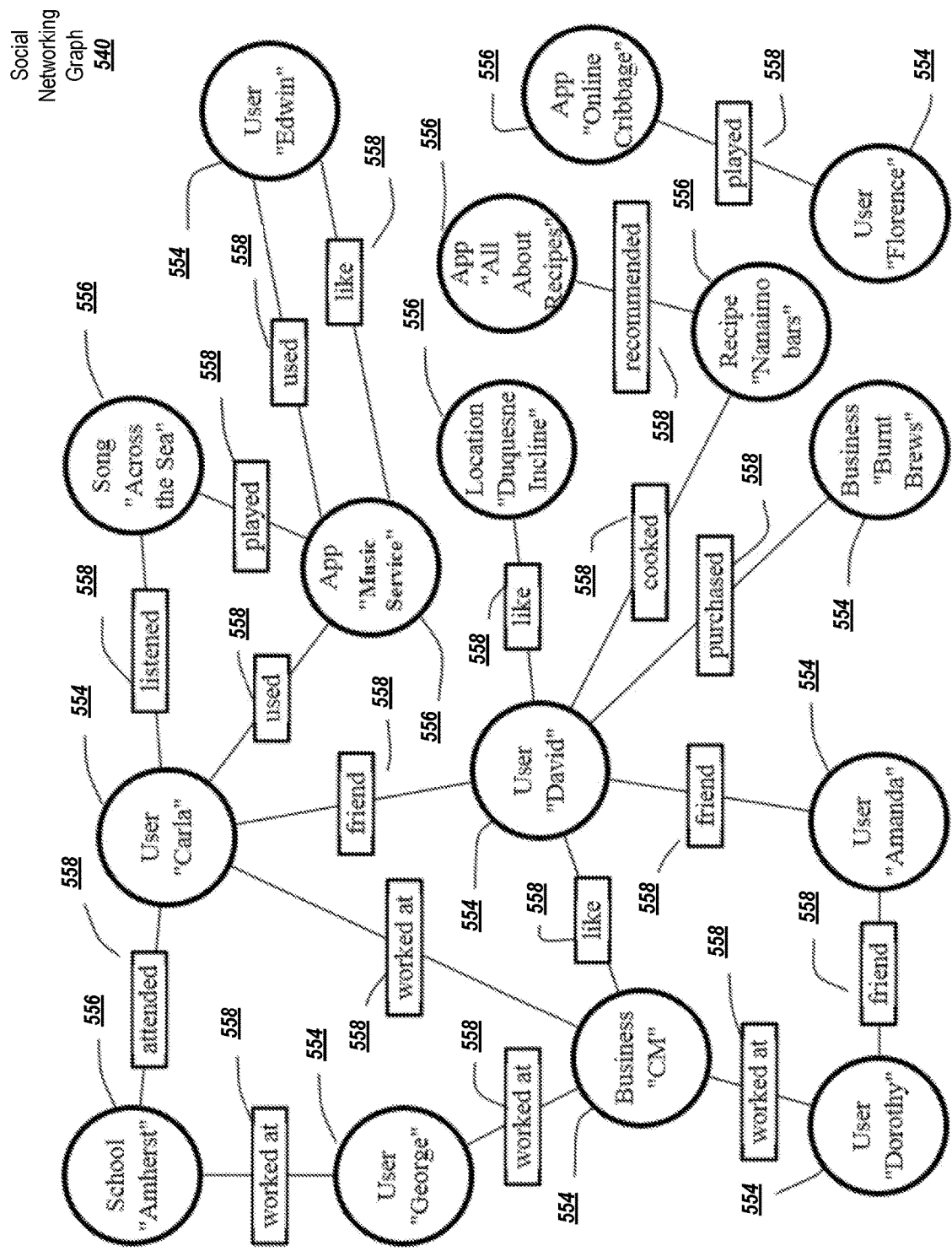
FIG. 5C depicts the social networking graph of FIGS. 5A-5B in more detail.

These examples may be implemented by a communications system that is provided either locally, at a client device, or remotely (e.g., at a remote server). FIGS. 5A-5C depict various examples of communications systems, and are discussed in more detail below.

FIG. 5A depicts an exemplary centralized communication system 500, in which functionality such as that described above is integrated into a communication server. The centralized system 500 may implement some or all of the structure and/or operations of a communication service in a single computing entity, such as entirely within a single centralized server device 526.

The communication system 500 may include a computer-implemented system having software applications that include one or more components. Although the communication system 500 shown in FIG. 5A has a limited number of elements in a certain topology, the communication system 500 may include more or fewer elements in alternate topologies.

A communication service 500 may be generally arranged to receive, store, and deliver messages. The communication service 500 may store messages or video communications while clients 520, such as may execute on client devices 510, are offline and deliver the messages/communications once the clients are available. Alternatively or in addition, the clients 520 may include social networking functionality.

A client device 510 may transmit messages addressed to a recipient user, user account, or other identifier resolving to a receiving client device 510. In exemplary embodiments, each of the client devices 510 and their respective communication clients 520 are associated with a particular user or users of the communication service 500. In some embodiments, the client devices 510 may be cellular devices such as smartphones and may be identified to the communication service 500 based on a phone number associated with each of the client devices 510. In some embodiments, each communication client may be associated with a user account registered with the communication service 500. In general, each communication client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the communication system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a communication client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the communication system 500. The ASR logic may be located at the client device 510 (so that the audio recording is processed locally by the client 510 and corresponding text is transmitted to the communication server 526), or may be located remotely at the communication server 526 (in which case, the audio recording may be transmitted to the communication server 526 and the communication server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a communication server 526. The communication server 526 may be operative to receive, store, and forward communications between clients.

The communication server 526 may include a network interface 522, communication preferences 528, and communications logic 530. The communication preferences 528 may include one or more privacy settings or other preferences for one or more users and/or message threads. Furthermore, the communication preferences 528 may include one or more settings, including default settings, for the logic described herein.

The communications logic 530 may include logic for implementing any or all of the above-described features of the present invention. Alternatively or in addition, some or all of the features may be implemented at the client 510-i, such as by being incorporated into an application such as the communication client 520.

The network interface 522 of the client 510 and/or the communication server 526 may also be used to communicate through the network 524 with an app server 540. The app server may store software or applications in an app library 544, representing software available for download by the client 510-i and/or the communication server 526 (among other entities). An app in the app library 544 may fully or partially implement the embodiments described herein. Upon receiving a request to download software incorporating exemplary embodiments, app logic 542 may identify a corresponding app in the app library 544 and may provide (e.g., via a network interface) the app to the entity that requested the software.

The network interface 522 of the client 510 and/or the communication server 526 may also be used to communicate through the network 524 with a social networking server 536. The social networking server 536 may include or may interact with a social networking graph 538 that defines connections in a social network. Furthermore, the communication server 526 may connect to the social networking server 536 for various purposes, such as retrieving connection information, communication history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the communication server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for Soda Company?"); lightweight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate. 5B depicts an exemplary distributed communication system 550, in which functionality for implementing exemplary embodiments is distributed and remotely accessible from the communication server. Examples of a distributed communication system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity (the app server 540 is omitted from the Figure for ease of discussion, although it is understood that this embodiment may also employ an app server 540). The primary difference between the centralized embodiment and the distributed embodiment is the addition of a separate processing server 552, which hosts the logic 530 for implementing exemplary embodiments. The processing server 552 may be distinct from the communication server 526 but may communicate with the communication server 526, either directly or through the network 524, to provide the functionality of the logic 530 and the logic 534 to the communication server 526.

The embodiment depicted in FIG. 5B may be particularly well suited to allow exemplary embodiments to be deployed alongside existing communication systems, for example when it is difficult or undesirable to replace an existing communication server. Additionally, in some cases the communication server 526 may have limited resources (e.g. processing or memory resources) that limit or preclude the addition of the additional pivot functionality. In such situations, the capabilities described herein may still be provided through the separate processing server 552.

In still further embodiments, the logic 532 may be provided locally at the client 510-i, for example as part of the communication client 520. In these embodiments, each client 510-i makes its own determination as to which messages belong to which thread, and how to update the display and issue notifications. As a result, different clients 510-i may display the same conversation differently, depending on local settings (for example, the same messages may be assigned to different threads, or similar threads may have different parents or highlights).

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (Music Service, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (Music Service) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "Music Service").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
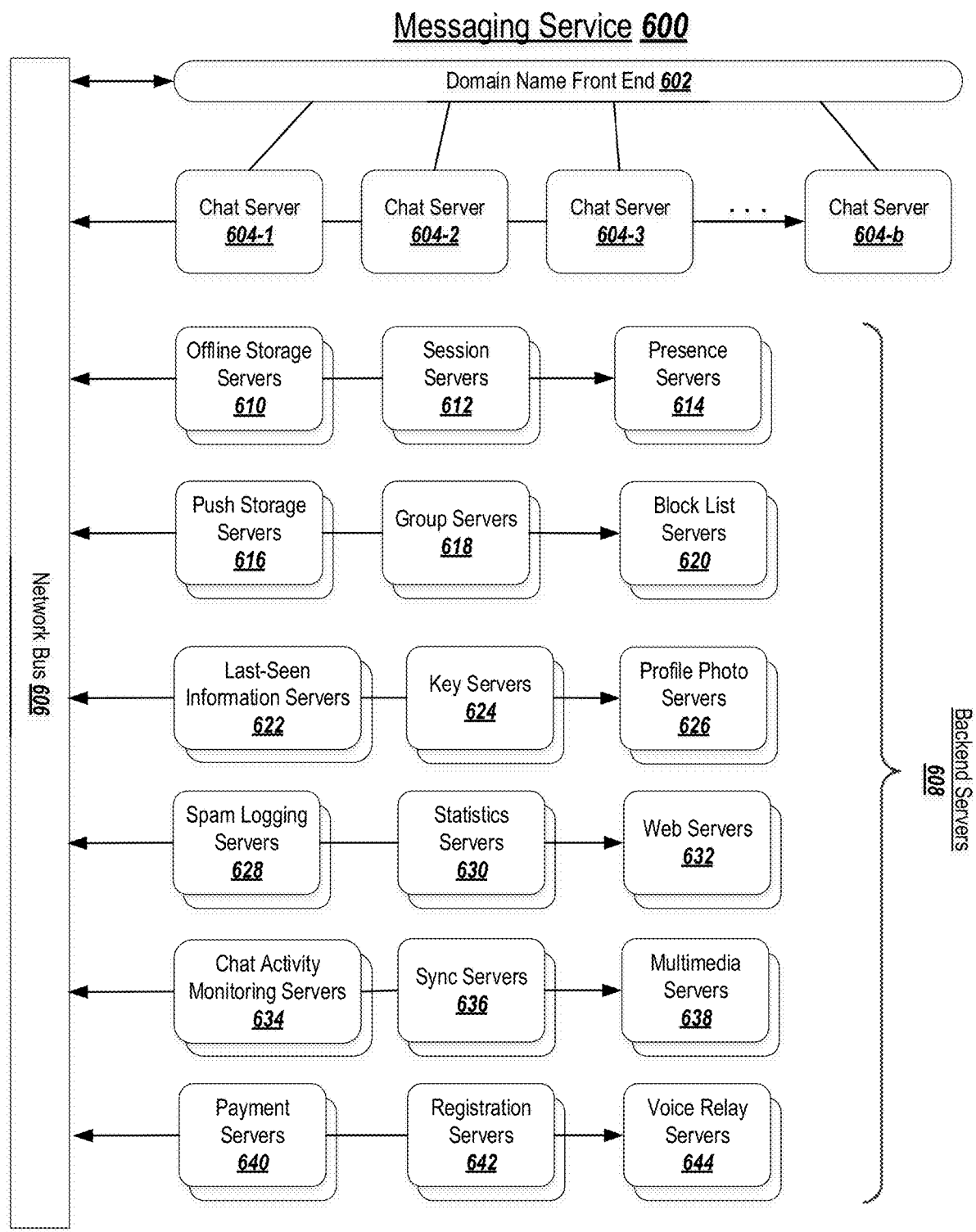
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-Internet-protocol (VoIP) voice communication between messaging clients for the performance of VoIP calls.

Figure 7:
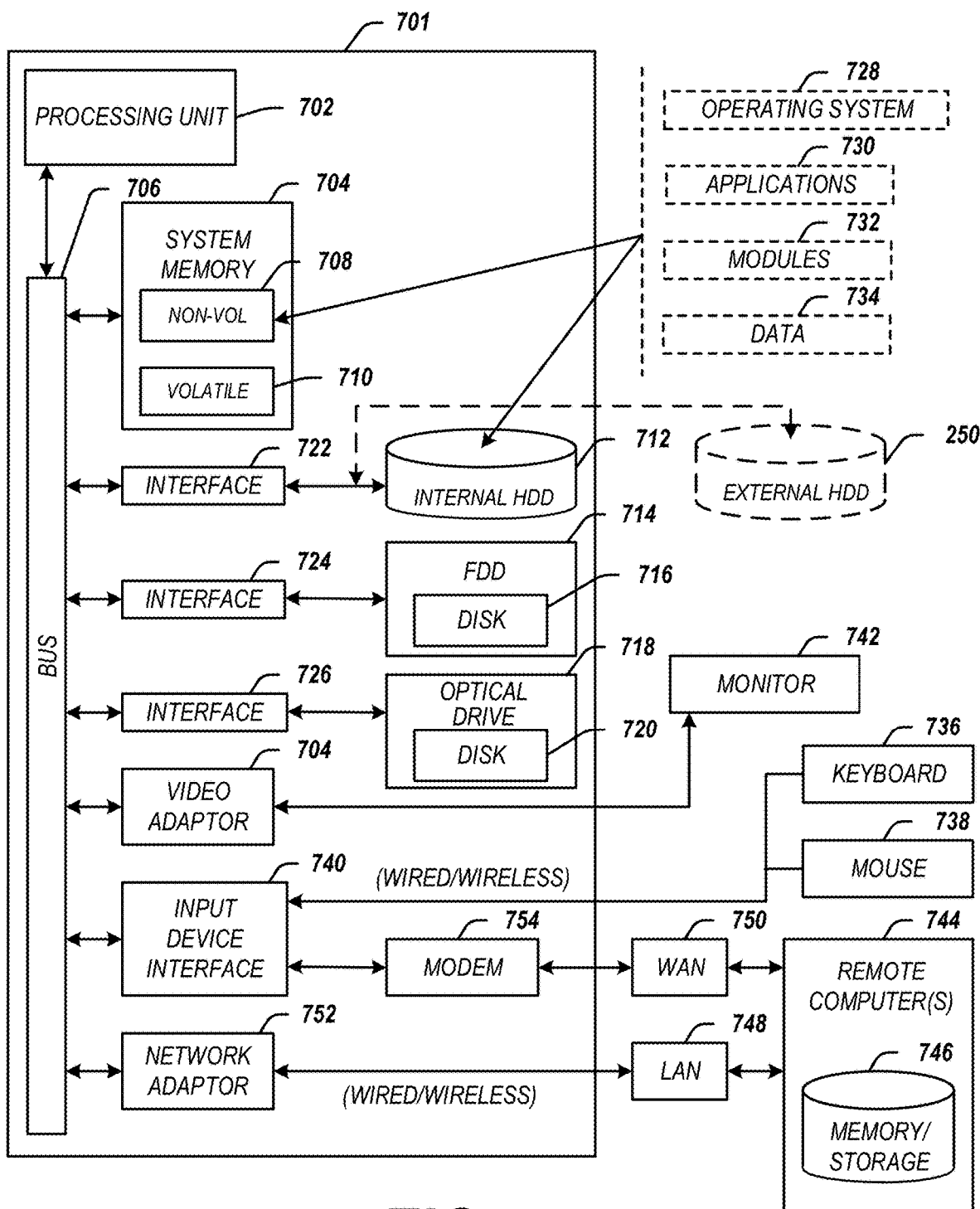
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an Athlon®, Duron® and Opteron® processors; an application, embedded and secure processors; and DragonBall® and PowerPC® processors; IBM and Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
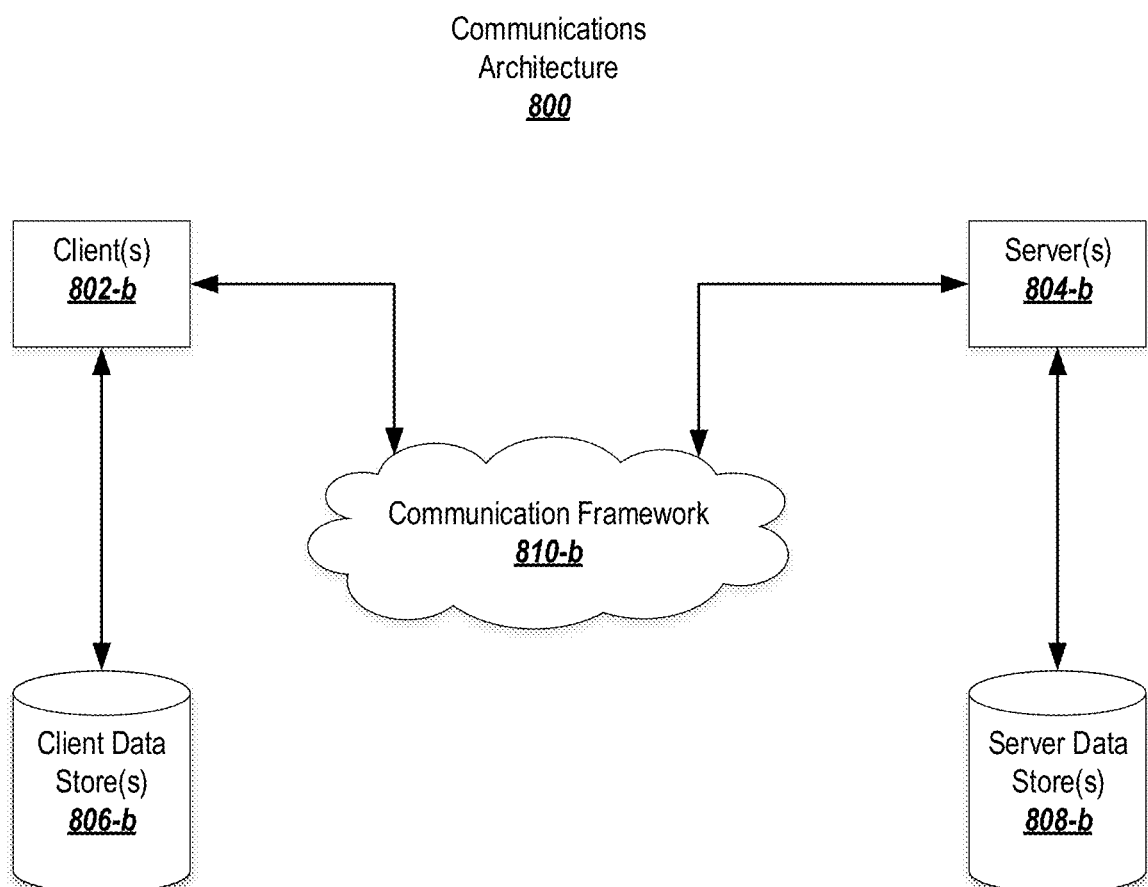
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
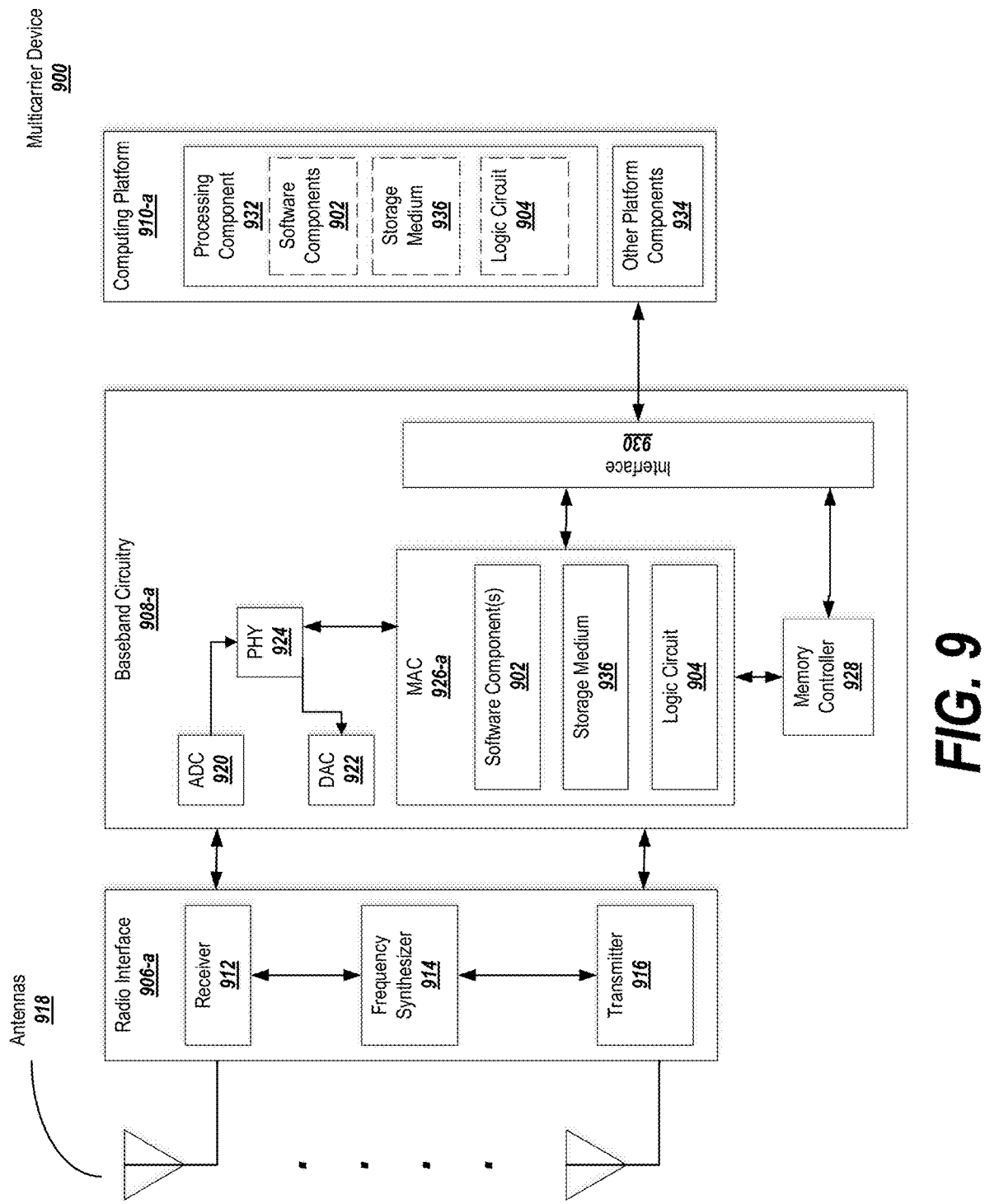
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
    receiving a plurality of images of a target entity specified in a request;
    identifying one or more target images from the plurality of images based on a suitability of the target images to be used as a media effect in a video, wherein the suitability is determined based on:
        whether a size of a face depicted in the target image exceeds a threshold size required to extract facial features from the face to be used in the media effect,
        whether the face is of a resolution greater than or equal to a target resolution, the target resolution selected based on a degree of detail suitable for use of the facial features in the media effect, and
        whether the face is within a predetermined angle of forward-facing in the image to extract facial features from the face to be used in the media effect;
    returning the one or more target images;
    selecting a first target image from the one or more target images;
    extracting facial features from the first target image; and
    generating the media effect from the extracted facial features, the media effect comprising a facial overlay configured to be applied over a face in the video.

2. The method of claim 1, further comprising receiving the request, wherein the plurality of images are received based on searching a database of publicly-available images, wherein the suitability is further determined based on whether one or more facial features are cut off in the image.

3. The method of claim 1, further comprising:
    determining that the resolution of the face is greater than or equal to the target resolution, wherein the facial features are further extracted based on the resolution of the face is greater than or equal to the target resolution; and
    applying the facial overlay to the video to replace the face in one or more frames of the video in real-time as the video is played.

4. The method of claim 1, further comprising:
    accessing the video, the video including one or more frames comprising the face in the video;
    mapping the extracted facial features to the face in the video;
    performing one or more of blending or recoloring on one or more of the face in the video or the media effect; and
    displaying the media effect in real-time as the video is played.

5. The method of claim 1, wherein the plurality of images are initially filtered based on whether the image contains a face before identifying suitable target images for application as the media effect.

6. The method of claim 1, wherein a plurality of target images are identified, the plurality of target images comprising faces at a plurality of different angles, the media effect configured to change to accommodate rotation of the face in the video.

7. A non-transitory computer-readable medium storing instructions configured to cause one or more processors to:
    receive a plurality of images of a target entity specified in a request;
    identify one or more target images from the plurality of images based on a suitability of the target images to be used as a media effect in a video, wherein the suitability is determined based on:
        whether a size of a face depicted in the target image exceeds a threshold size required to extract facial features from the face to be used in the media effect,
        whether the face is of a resolution greater than or equal to a target resolution, the target resolution selected based on a degree of detail suitable for use of the facial features in the media effect, and
        whether the face is within a predetermined angle of forward-facing in the image to extract facial features from the face to be used in the media effect;
    return the one or more target images;
    select a first target image from the one or more target images;
    extract facial features from the first target image; and
    generate the media effect from the extracted facial features, the media effect comprising a facial overlay configured to be applied over a face in the video.

8. The medium of claim 7, wherein the plurality of images are received based on searching a database of publicly-available images, wherein the suitability is further determined based on whether one or more facial features are cut off in the image.

9. The medium of claim 7, further storing instructions for:
    determining that the resolution of the face is greater than or equal to the target resolution, wherein the facial features are further extracted based on the resolution of the face is greater than or equal to the target resolution; and
    applying the facial overlay to the video to replace the face in the video in one or more frames of the video in real-time as the video is played.

10. The medium of claim 7, further storing instructions for:
    accessing the video, the video including one or more frames comprising the face in the video;
    mapping the extracted facial features to the face in the video;
    performing one or more of blending or recoloring on one or more of the face in the video or the media effect; and
    displaying the media effect in real-time as the video is played.

11. The medium of claim 7, wherein the plurality of images are initially filtered based on whether the image contains a face before identifying suitable target images for application as the media effect.

12. The medium of claim 7, wherein a plurality of target images are identified, the plurality of target images comprising faces at a plurality of different angles, the media effect configured to change to accommodate rotation of the face in the video.

13. An apparatus comprising:
a non-transitory computer readable medium storing computer-readable instructions; and
a processor circuit configured to execute the instructions to:
receive a request identifying a target entity;
perform an image search to retrieve a plurality of images of the target entity;
identify one or more target images from the plurality of images based on a suitability of the target images to be used as a media effect in a video, wherein the suitability is determined based on:
whether a size of a face depicted in the target image exceeds a threshold size required to extract facial features from the face to be used in the media effect,
whether the face is of a resolution greater than or equal to a target resolution, the target resolution selected based on a degree of detail suitable for use of the facial features in the media effect, and
whether the face is within a predetermined angle of forward-facing in the image to extract facial features from the face to be used in the media effect;
return the one or more target images;
select a first target image from the one or more target images;
extract facial features from the first target image; and
generate the media effect from the extracted facial features, the media effect comprising a facial overlay configured to be applied over a face in the video.

14. The apparatus of claim 13, wherein performing the image search comprises searching a database of publicly-available images, wherein the suitability is further determined based on whether one or more facial features are cut off in the image.

15. The apparatus of claim 13, the processor circuit further configured to:
determine that the resolution of the face is greater than or equal to the target resolution, wherein the facial features are further extracted based on the resolution of the face is greater than or equal to the target resolution; and
apply the facial overlay to the video to replace the face in the video in one or more frames of the video in real-time as the video is played.

16. The apparatus of claim 13, the processor circuit further configured to:
access the video, the video including one or more frames comprising the face in the video;
map the extracted facial features to the face in the video;
perform one or more of blending or recoloring on one or more of the face in the video or the media effect; and
display the media effect in real-time as the video is played.

17. The apparatus of claim 13, wherein the plurality of images are initially filtered based on whether the image contains a face before identifying suitable target images for application as the media effect.

* * * * *